(12) United States Patent
Tomblin et al.

(10) Patent No.: US 9,262,574 B2
(45) Date of Patent: Feb. 16, 2016

(54) VOLTAGE-RELATED ANALYSIS OF LAYOUT DESIGN DATA

(71) Applicant: Mentor Graphics Corporation, Wilsonville, OR (US)

(72) Inventors: Jimmy Jason Tomblin, Portland, OR (US); Laurence Grodd, Portland, OR (US)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 14/133,541

(22) Filed: Dec. 18, 2013

(65) Prior Publication Data

US 2014/0189613 A1     Jul. 3, 2014

Related U.S. Application Data

(60) Provisional application No. 61/738,996, filed on Dec. 18, 2012.

(51) Int. Cl.
*G06F 17/50*         (2006.01)

(52) U.S. Cl.
CPC ........ *G06F 17/5081* (2013.01); *G06F 17/5036* (2013.01); *G06F 2217/78* (2013.01)

(58) Field of Classification Search
CPC ............ G06F 17/5081; G06F 17/5068; H01L 27/0207
USPC ............................................................ 716/52
See application file for complete search history.

(56) References Cited

U.S. PATENT DOCUMENTS

| | | | |
|---|---|---|---|
| 6,971,074 B2 * | 11/2005 | Hasegawa et al. ............ | 716/120 |
| 2014/0007031 A1 * | 1/2014 | Huang et al. .................. | 716/112 |

* cited by examiner

*Primary Examiner* — Jack Chiang
*Assistant Examiner* — Brandon Bowers
(74) *Attorney, Agent, or Firm* — Klarquist Sparkman, LLP

(57) ABSTRACT

Disclosed are representative embodiments of methods, apparatus, and systems for voltage-related analysis of layout design data. According to embodiments of the disclosed technology, voltage association data objects are generated for drawn layers in a net of a layout design and voltage values or ranges of voltage values associated with the net are collected. The voltage values or ranges of voltage values are then associated with the voltage association data objects. A voltage-related analysis may be performed by searching the voltage association data objects according to a predetermined criterion.

20 Claims, 7 Drawing Sheets

| | 505 | 507 | 509 |
|---|---|---|---|
| DESIGN OBJECT 1 | 12, 24 | LIBRARY 1, 12 | .00009 |
| DESIGN OBJECT 2 | 16, 274 | LIBRARY 2, 37 | .00003 |
| DESIGN OBJECT 3 | 128, 320 | LIBRARY 3, 5 | .000042 |
| DESIGN OBJECT 4 | 100, 200 | LIBRARY 4, 14 | .000032 |
| DESIGN OBJECT 5 | 4, 63 | LIBRARY 5, 4 | .00004 |
| DESIGN OBJECT 6 | 57, 90 | LIBRARY 6, 1 | .000011 |
| DESIGN OBJECT 7 | 26, 240 | LIBRARY 7, 22 | .000012 |
| DESIGN OBJECT 8 | 40, 8 | LIBRARY 8, 9 | .000009 |
| DESIGN OBJECT 9 | 97, 23 | LIBRARY 9, 5 | .000061 |
| DESIGN OBJECT 11 | 121, 180 | LIBRARY 10, 11 | .000010 |

VOLTAGE-RELATED ANALYSIS OF LAYOUT DESIGN DATA

RELATED APPLICATIONS

This application claims priority to U.S. Provisional Patent Application No. 61/738,996, entitled "VOLTAGE-RELATED ANALYSIS OF LAYOUT DESIGN DATA," filed on Dec. 18, 2012, and naming James Tomblin et al. as inventors, which application is incorporated entirely herein by reference.

This application is related to U.S. patent application Ser. No. 12/397,344, filed on Feb. 20, 2009, entitled "Property-Based Classification In Electronic Design Automation" and naming Fedor G. Pikus as inventor, which application is incorporated entirely herein by reference. This application also is related to U.S. patent application Ser. No. 11/869,731 entitled "Properties In Electronic Design Automation," filed on Oct. 9, 2007, and naming Fedor Pikus as inventor, which application is incorporated entirely herein by reference as well.

FIELD OF THE INVENTION

The present invention is directed to the use of properties for voltage-related analysis of layout design data in electronic design automation. Various implementations of the invention may be useful for identifying geometric elements in layout design data that are associated with a particular voltage value or values.

BACKGROUND OF THE INVENTION

Many microdevices, such as integrated circuits, have become so complex that these devices cannot be manually designed. For example, even a simple microprocessor may have millions and millions of transistors that cooperate to form the components of the microprocessor. As a result, electronic design automation tools have been created to assist circuit designers in analyzing a circuit design before it is manufactured. These electronic design automation tools typically will execute one or more electronic design automation (EDA) processes to verify that the circuit design complies with specified requirements, identify problems in the design, modify the circuit design to improve its manufacturability, or some combination thereof. For example, some electronic design automation tools may provide one or more processes for simulating the operation of a circuit manufactured from a circuit design to verify that the design will provides the desired functionality. Still other electronic design automation tools may alternately or additionally provide one or more processes for confirming that a circuit design matches the intended circuit schematic, for identifying portions of a circuit design that do not comply with preferred design conventions, for identifying flaws or other weaknesses the design, or for modifying the circuit design to address any of these issues. Examples of electronic design automation tools include the Calibre family of software tools available from Mentor Graphics Corporation of Wilsonville, Oreg.

As electronic design automation tools continue to develop, greater sophistication is being demanded from these tools. For example, in addition to detecting obvious design flaws, many electronic design automation tools are now expected to identify those design objects in a design that have a significant likelihood of being improperly formed during the manufacturing process, determine the resultant impact on manufacturing yield that these design objects will create, and/or identify design changes that will allow the design objects to be more reliably manufactured during the manufacturing process (e.g., "design-for-manufacture" (DFM)). In order to meet these expectations, a process executed by an electronic design automation tool may need to perform more calculations than with previous generations of electronic design automation tools. For example, a design rule check process may confirm that the polygons used in a physical layout design to form individual wiring lines are separated by a minimum specified distance. In addition, however, the design rule check process also may determine the likelihood that the polygons may nonetheless form the wiring lines with an erroneous bridging fault. This determination may require, for example, calculating the distance between the polygons, the length for which the polygons run adjacent to each other, and the thickness of the polygons at their adjacent portions.

As process nodes are becoming smaller, foundries are requiring or performing more voltage-related checks for layout design data. For example, a foundry may determine that a given spacing between geometric elements is acceptable when the geometric elements are associated with a relatively small voltage drop. If, however, the geometric elements are associated with a relatively large voltage difference, then the foundry may deem that the same spacing between the geometric elements is too small, and must be changed.

To facilitate this type of voltage-related analysis, a designer will typically add voltage markers to layout design data. These markers associate a specific geometric element in the layout design data with a particular voltage. With some automated design tools, such as the Calibre® family of physical verification tools available from Mentor Graphics Corporation of Wilsonville, Oreg., a voltage marker can be implemented by a geometric element positioned to overlap (and thus be associated with) the geometric element for which the voltage is being specified. The specified voltage value can then attached to the marker as a "property" value, as described in detail in U.S. patent application Ser. No. 11/869,731 entitled "Properties In Electronic Design Automation," filed on Oct. 9, 2007, and naming Fedor Pikus as inventor, which application is incorporated entirely herein by reference as well. In this manner, the specified voltage value is associated with a circuit geometric element through the marker geometric element.

When an electronic design automation tool initiates a check (such as a design rule check) to be performed on geometric elements associated with a specific voltage value or range of voltage values, the tool can identify relevant geometric elements by examining the voltage markers. For example, the tool can determine whether geometric elements in a net are associated with a voltage value or range of voltage values by examining all of the voltage markers for all of the geometric elements in the net. While this arrangement is helpful, it is also very time consuming and computationally expensive, since the tool must examine all of the voltage markers for all of the geometric elements in the net. Because even a single process executed by an electronic design automation tool may require millions of calculations, improvements in the speed and efficiency of electronic design automation tools are continuously being sought.

BRIEF SUMMARY OF THE INVENTION

Aspects of the invention relate to techniques of more efficiently processing data for voltage-related analyses of layout design data. As will be discussed in detail below, embodiments of both tools and methods implementing these techniques have particular application for rapidly identifying geometric elements associated with a voltage value or range of voltage values.

According to various implementations of the invention, a voltage association data object is created for a drawn layer in a net of layout design data. Typically, the voltage association data object is created for a physical drawn layer, which represents a physical layer of material in an integrated circuit to be made using the layout design data. For example, the voltage association data object may be attached to a first drawn layer (metal 1) representing a first layer of metal in the integrated circuit, a second drawn layer (poly 1) representing a first layer of poly material in the integrated circuit, or a third metal layer (metal 2) representing a second layer of metal in the integrated circuit. Of course, with various implementations of the invention, a voltage association data object may be attached to an abstract drawn layer (i.e., a drawn layer that does not directly correspond to a physical layer in an integrated circuit) in a net, or to a derived layer in a net.

With various implementations of the invention, the voltage association data object may itself be an object in a drawn layer, such as a trapezoid. This arrangement allows the voltage association data object to be attached to a drawn layer in a net by placing the object (e.g., the trapezoid) in the layout design data so that it overlays a geometric element in the desired drawn layer.

Once the voltage association data object has been attached to a drawn layer in net, then all of the voltage values or ranges of voltage values associated with that net are identified. As discussed in detail above, this information can be obtained by examining all of the geometric elements in the net, and recording the voltage information from those geometric elements associated with voltage markers. Alternately, various implementations of the invention may create the voltage association data object before any voltage markers are created, and the voltage information may be automatically identified as each voltage marker is added to the layout design data.

The voltage values or ranges of voltage values for the net are then attached to the voltage association data object. With various implementations of the invention, the voltage values or ranges of voltage values may be attached to the voltage association data object as properties. Of course, still other implementations of the invention may employ any desired technique to attach the obtained voltage values or ranges of voltage values for the net to the voltage association data object.

With various implementations of the invention, a voltage association data object will be attached to each layer in each net of the layout design data. With this arrangement, an electronic design verification tool need only review the voltage association data objects for a particular layer to determine if any nets in the design data include geometric elements in that layer associated with a voltage value or range of voltage values. For example, an electronic design verification tool may need to perform a particular design rule check on all geometric elements in a metal 1 layer associated with a specified range of voltages. Rather than examining all geometric elements in all layers of all nets, various implementations of the invention allow the electronic design verification tool to perform a significantly smaller search. In particular, the electronic design verification tool need only identify the voltage association data object attached to the metal 1 layer in each net. The an electronic design verification tool can then examine the ranges of voltage values associated with those voltage association data objects to determine which nets have geometric elements in the metal 1 layer associated with the specified range of voltages.

These and other features and aspects of the invention will be apparent upon consideration of the following detailed description.

BRIEF DESCRIPTION OF THE DRAWINGS

FIG. 5 illustrates one example of a type of array that may be employed by various embodiments of the invention.

DETAILED DESCRIPTION OF THE INVENTION

Illustrative Operating Environment

The execution of various electronic design automation processes according to embodiments of the invention may be implemented using computer-executable software instructions executed by one or more programmable computing devices. Because these embodiments of the invention may be implemented using software instructions, the components and operation of a generic programmable computer system on which various embodiments of the invention may be employed will first be described. Further, because of the complexity of some electronic design automation processes and the large size of many circuit designs, various electronic design automation tools are configured to operate on a computing system capable of simultaneously running multiple processing threads. The components and operation of a computer network having a host or master computer and one or more remote or servant computers therefore will be described with reference to FIG. 1. This operating environment is only one example of a suitable operating environment, however, and is not intended to suggest any limitation as to the scope of use or functionality of the invention.

Figure 1:
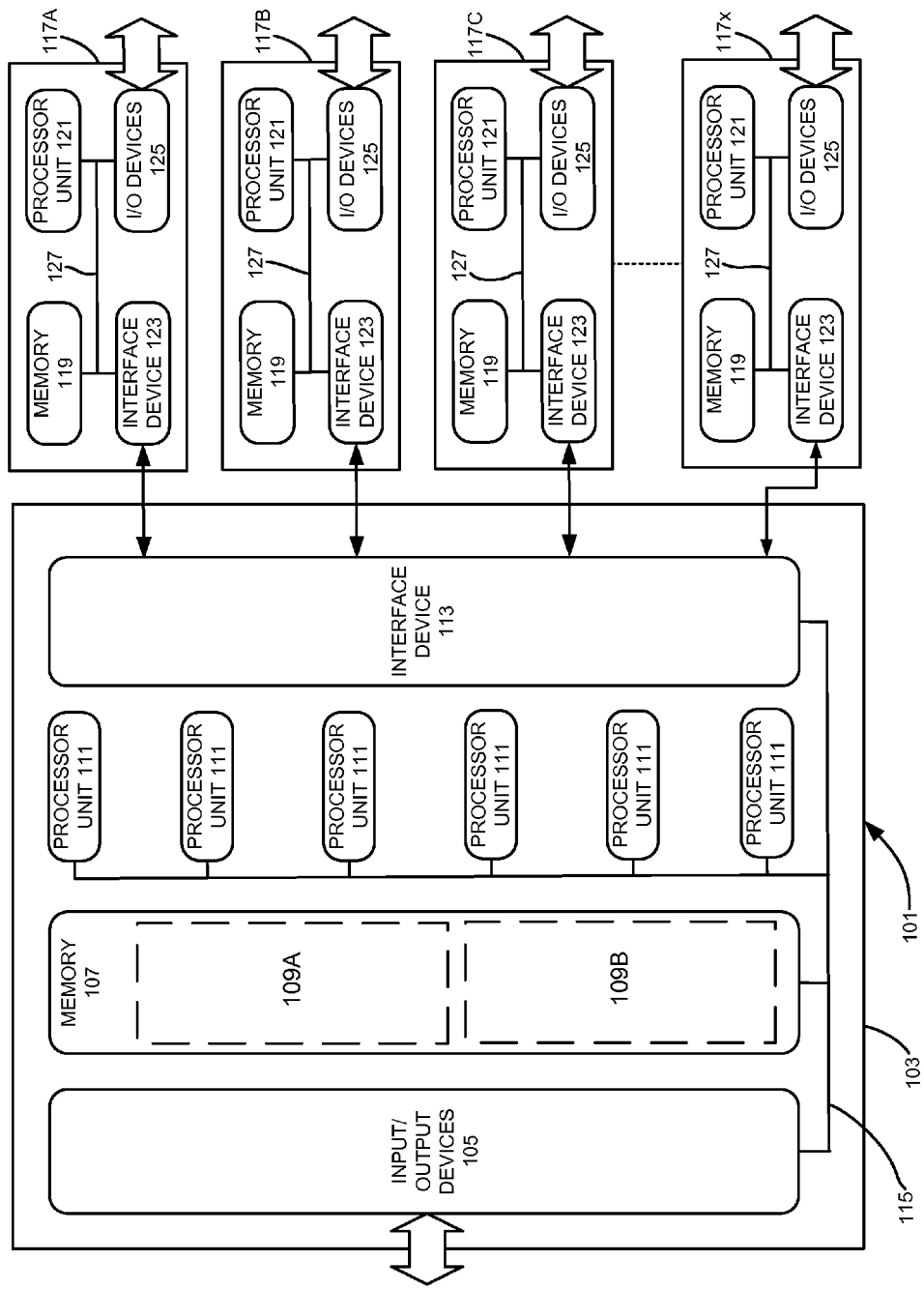
FIG. 1 illustrates an example of a computing system that may be used to implement various embodiments of the invention.

In FIG. 1, the computer network 101 includes a master computer 103. In the illustrated example, the master computer 103 is a multi-processor computer that includes a plurality of input and output devices 105 and a memory 107. The input and output devices 105 may include any device for receiving input data from or providing output data to a user. The input devices may include, for example, a keyboard, microphone, scanner or pointing device for receiving input from a user. The output devices may then include a display monitor, speaker, printer or tactile feedback device. These devices and their connections are well known in the art, and thus will not be discussed at length here.

The memory 107 may similarly be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information.

As will be discussed in detail below, the master computer 103 runs a software application for performing one or more operations according to various examples of the invention. Accordingly, the memory 107 stores software instructions 109A that, when executed, will implement a software application for performing one or more operations. The memory 107 also stores data 109B to be used with the software application. In the illustrated embodiment, the data 109B contains process data that the software application uses to perform the operations, at least some of which may be parallel.

The master computer 103 also includes a plurality of processor units 111 and an interface device 113. The processor units 111 may be any type of processor device that can be programmed to execute the software instructions 109A, but will conventionally be a microprocessor device. For example, one or more of the processor units 111 may be a commercially generic programmable microprocessor, such as Intel® Pentium® or Xeon™ microprocessors, Advanced Micro Devices Athlon™ microprocessors or Motorola 68K/Coldfire® microprocessors. Alternately or additionally, one or more of the processor units 111 may be a custom-manufactured processor, such as a microprocessor designed to optimally perform specific types of mathematical operations. The interface device 113, the processor units 111, the memory 107 and the input/output devices 105 are connected together by a bus 115.

Figure 2:
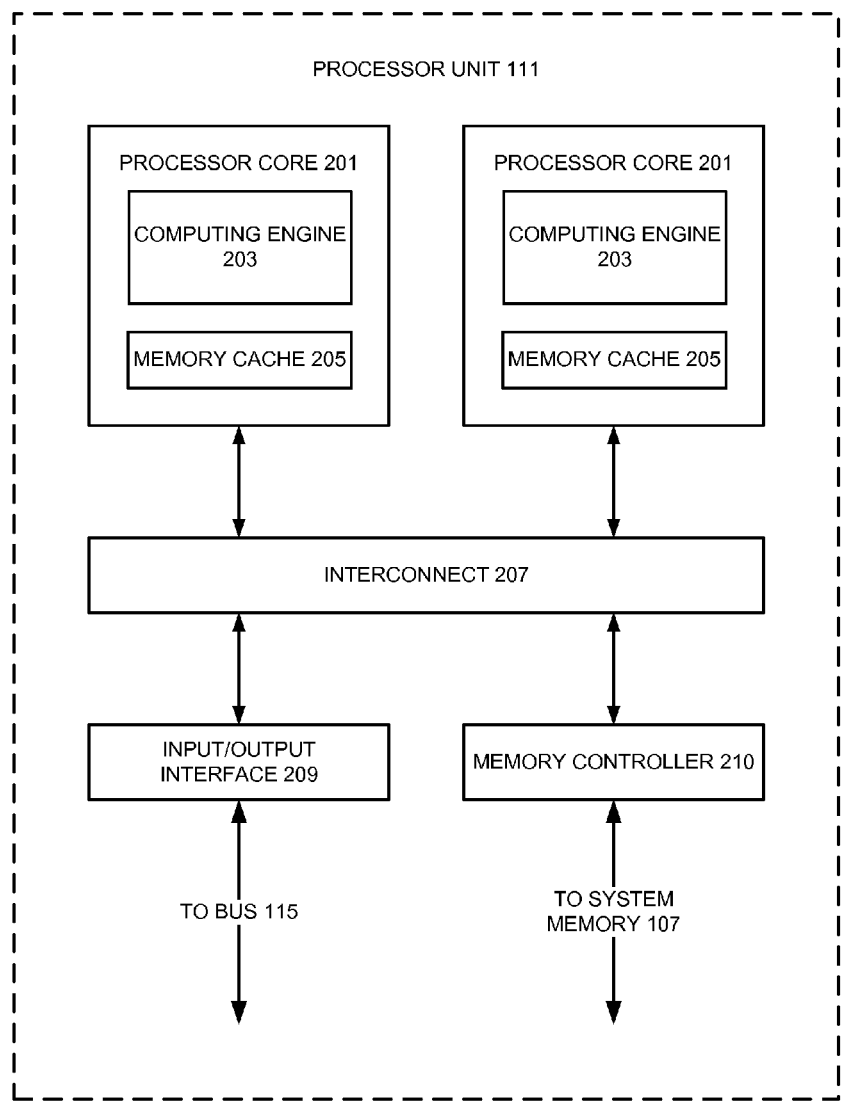
FIG. 2 illustrates an example of a multi-core processor unit that may be used to implement various embodiments of the invention.

With some implementations of the invention, the master computing device 103 may employ one or more processing units 111 having more than one processor core. Accordingly, FIG. 2 illustrates an example of a multi-core processor unit 111 that may be employed with various embodiments of the invention. As seen in this figure, the processor unit 111 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 201. With some processor cores 201, such as the Cell microprocessor created by Sony Corporation, Toshiba Corporation and IBM Corporation, the interconnect 207 may be implemented as an interconnect bus. With other processor units 201, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interface 209 and a memory controller 211. The input/output interface 209 provides a communication interface between the processor unit 201 and the bus 115. Similarly, the memory controller 211 controls the exchange of information between the processor unit 201 and the system memory 107. With some implementations of the invention, the processor units 201 may include additional components, such as a high-level cache memory accessible shared by the processor cores 201.

It should be appreciated that, with some implementations, a multi-core processor unit 111 can be used in lieu of multiple, separate processor units 111. For example, rather than employing six separate processor units 111, an alternate implementation of the invention may employ a single processor unit 111 having six cores, two multi-core processor units each having three cores, a multi-core processor unit 111 with four cores together with two separate single-core processor units 111, etc.

Returning now to FIG. 1, the interface device 113 allows the master computer 103 to communicate with the servant computers 117A, 117B, 117C . . . 117x through a communication interface. The communication interface may be any suitable type of interface including, for example, a conventional wired network connection or an optically transmissive wired network connection. The communication interface may also be a wireless connection, such as a wireless optical connection, a radio frequency connection, an infrared connection, or even an acoustic connection. The interface device 113 translates data and control signals from the master computer 103 and each of the servant computers 117 into network messages according to one or more communication protocols, such as the transmission control protocol (TCP), the user datagram protocol (UDP), and the Internet protocol (IP). These and other conventional communication protocols are well known in the art, and thus will not be discussed here in more detail.

Each servant computer 117 may include a memory 119, a processor unit 121, an interface device 123, and, optionally, one more input/output devices 125 connected together by a system bus 127. As with the master computer 103, the optional input/output devices 125 for the servant computers 117 may include any conventional input or output devices, such as keyboards, pointing devices, microphones, display monitors, speakers, and printers. Similarly, the processor units 121 may be any type of conventional or custom-manufactured programmable processor device. For example, one or more of the processor units 121 may be commercially generic programmable microprocessors, such as Intel® Pentium® or Xeon™ microprocessors, Advanced Micro Devices Athlon™ microprocessors or Motorola 68K/Coldfire® microprocessors. Alternately, one or more of the processor units 121 may be custom-manufactured processors, such as microprocessors designed to optimally perform specific types of mathematical operations. Still further, one or more of the processor units 121 may have more than one core, as described with reference to FIG. 2 above. For example, with some implementations of the invention, one or more of the processor units 121 may be a Cell processor. The memory 119 then may be implemented using any combination of the computer readable media discussed above. Like the interface device 113, the interface devices 123 allow the servant computers 117 to communicate with the master computer 103 over the communication interface.

In the illustrated example, the master computer 103 is a multi-processor unit computer with multiple processor units 111, while each servant computer 117 has a single processor unit 121. It should be noted, however, that alternate implementations of the invention may employ a master computer having single processor unit 111. Further, one or more of the servant computers 117 may have multiple processor units 121, depending upon their intended use, as previously discussed. Also, while only a single interface device 113 or 123 is illustrated for both the master computer 103 and the servant computers, it should be noted that, with alternate embodiments of the invention, either the computer 103, one or more of the servant computers 117, or some combination of both may use two or more different interface devices 113 or 123 for communicating over multiple communication interfaces.

With various examples of the invention, the master computer 103 may be connected to one or more external data storage devices. These external data storage devices may be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information. According to some implementations of the invention, one or more of the servant computers 117 may alternately or additionally be connected to one or more external data storage devices. Typically, these external data storage devices will include data storage devices that also are connected to the master computer 103, but they also may be different from any data storage devices accessible by the master computer 103.

It also should be appreciated that the description of the computer network illustrated in FIG. 1 and FIG. 2 is provided as an example only, and it not intended to suggest any limitation as to the scope of use or functionality of alternate embodiments of the invention.

Electronic Design Automation

As previously noted, various embodiments of the invention are related to electronic design automation. In particular, various implementations of the invention may be used to improve the operation of electronic design automation software tools that identify, verify and/or modify design data for manufacturing a microdevice, such as a microcircuit. As used herein, the terms "design" and "design data" are intended to encompass data describing an entire microdevice, such as an integrated circuit device or micro-electromechanical system (MEMS) device. This term also is intended to encompass a smaller set of data describing one or more components of an entire microdevice, however, such as a layer of an integrated circuit device, or even a portion of a layer of an integrated circuit device. Still further, the terms "design" and "design data" also are intended to encompass data describing more than one microdevice, such as data to be used to create a mask or reticle for simultaneously forming multiple microdevices on a single wafer. It should be noted that, unless otherwise specified, the term "design" as used herein is intended to encompass any type of design, including both a physical layout design and a logical design.

Designing and fabricating microcircuit devices involve many steps during a 'design flow' process. These steps are highly dependent on the type of microcircuit, its complexity, the design team, and the fabricator or foundry that will manufacture the microcircuit from the design. Several steps are common to most design flows, however. First, a design specification is modeled logically, typically in a hardware design language (HDL). Once a logical design has been created, various logical analysis processes are performed on the design to verify its correctness. More particularly, software and hardware "tools" verify that the logical design will provide the desired functionality at various stages of the design flow by running software simulators and/or hardware emulators, and errors are corrected. For example, a designer may employ one or more functional logic verification processes to verify that, given a specified input, the devices in a logical design will perform in the desired manner and provide the appropriate output.

In addition to verifying that the devices in a logic design will provide the desired functionality, some designers may employ a design logic verification process to verify that the logical design meets specified design requirements. For example, a designer may create rules such as, e.g., every transistor gate in the design must have an electrical path to ground that passes through no more than three other devices, or every transistor that connects to a specified power supply also must be connected to a corresponding ground node, and not to any other ground node. A design logic verification process then will determine if a logical design complies with specified rules, and identify occurrences where it does not.

After the logical design is deemed satisfactory, it is converted into physical design data by synthesis software. This physical design data or "layout" design data may represent, for example, the geometric elements that will be written onto a mask used to fabricate the desired microcircuit device in a photolithographic process at a foundry. For conventional mask or reticle writing tools, the geometric elements typically will be polygons of various shapes. Thus, the layout design data usually includes polygon data describing the features of polygons in the design. It is very important that the physical design information accurately embody the design specification and logical design for proper operation of the device. Accordingly, after it has been created during a synthesis process, the physical design data is compared with the original logical design schematic in a process sometimes referred to as a "layout-versus-schematic" (LVS) process.

Once the correctness of the logical design has been verified, and geometric data corresponding to the logical design has been created in a layout design, the geometric data then may be analyzed. For example, because the physical design data is employed to create masks used at a foundry, the data must conform to the foundry's requirements. Each foundry specifies its own physical design parameters for compliance with their processes, equipment, and techniques. Accordingly, the design flow may include a process to confirm that the design data complies with the specified parameters. During this process, the physical layout of the circuit design is compared with design rules in a process commonly referred to as a "design rule check" (DRC) process. In addition to rules specified by the foundry, the design rule check process may also check the physical layout of the circuit design against other design rules, such as those obtained from test chips, general knowledge in the industry, previous manufacturing experience, etc.

With modern electronic design automation design flows, a designer may additionally employ one or more "design-for-manufacture" (DFM) software tools. As previously noted, design rule check processes attempt to identify, e.g., elements representing structures that will almost certainly be improperly formed during a manufacturing process. "Design-For-Manufacture" tools, however, provide processes that attempt to identify elements in a design representing structures with a significant likelihood of being improperly formed during the manufacturing process. A "design-for-manufacture" process may additionally determine what impact the improper formation of the identified elements will have on the yield of devices manufactured from the circuit design, and/or modifications that will reduce the likelihood that the identified elements will be improperly formed during the manufacturing process. For example, a "design-for-manufacture" (DFM) software tool may identify wires that are connected by only a single via, determine the yield impact for manufacturing a circuit from the design based upon the probability that each individual single via will be improperly formed during the manufacturing process, and then identify areas where redundant vias can be formed to supplement the single vias.

It should be noted that, in addition to "design-for-manufacture," various alternate terms are used in the electronic design automation industry. Accordingly, as used herein, the term "design-for-manufacture" or "design-for-manufacturing" is intended to encompass any electronic design automation process that identifies elements in a design representing structures that may be improperly formed during the manufacturing process. Thus, "design-for-manufacture" (DFM) software tools will include, for example, "lithographic friendly design" (LFD) tools that assist designers to make trade-off decisions on how to create a circuit design that is more robust and less sensitive to lithographic process windows. They will also include "design-for-yield" (DFY) electronic design automation tools, "yield assistance" electronic design automation tools, and "chip cleaning" and "design cleaning" electronic design automation tools.

After a designer has used one or more geometry analysis processes to verify that the physical layout of the circuit design is satisfactory, the designer may then perform one or more simulation processes to simulate the operation of a manufacturing process, in order to determine how the design will actually be realized by that particular manufacturing process. A simulation analysis process may additionally modify the design to address any problems identified by the simulation. For example, some design flows may employ one or more processes to simulate the image formed by the physical layout of the circuit design during a photolithographic process, and then modify the layout design to improve the resolution of the image that it will produce during a photolithography process.

These resolution enhancement techniques (RET) may include, for example, modifying the physical layout using optical proximity correction (OPC) or by the addition of sub-resolution assist features (SRAF). Other simulation analysis processes may include, for example, phase shift mask (PSM) simulation analysis processes, etch simulation analysis processes and planarization simulation analysis processes. Etch simulation analysis processes simulate the removal of materials during a chemical etching process, while planarization simulation processes simulate the polishing of the circuit's surface during a chemical-mechanical etching process. These simulation analysis processes may identify, for example, regions where an etch or polishing process will not leave a sufficiently planar surface. These simulation analysis processes may then modify the physical layout design to, e.g., include more geometric elements in those regions to increase their density.

Once a physical layout design has been finalized, the geometric elements in the design are formatted for use by a mask or reticle writing tool. Masks and reticles typically are made using tools that expose a blank reticle or mask substrate to an electron or laser beam (or to an array of electron beams or laser beams), but most mask writing tools are able to only "write" certain kinds of polygons, however, such as right triangles, rectangles or other trapezoids. Moreover, the sizes of the polygons are limited physically by the maximum beam (or beam array) size available to the tool. Accordingly, the larger geometric elements in a physical layout design data will typically be "fractured" into the smaller, more basic polygons that can be written by the mask or reticle writing tool.

It should be appreciated that various design flows may repeat one or more processes in any desired order. Thus, with some design flows, geometric analysis processes can be interleaved with simulation analysis processes and/or logical analysis processes. For example, once the physical layout of the circuit design has been modified using resolution enhancement techniques, then a design rule check process or design-for-manufacturing process may be performed on the modified layout, Further, these processes may be alternately repeated until a desired degree of resolution for the design is obtained. Similarly, a design rule check process and/or a design-for-manufacturing process may be employed after an optical proximity correction process, a phase shift mask simulation analysis process, an etch simulation analysis process or a planarization simulation analysis process. Examples of electronic design tools that employ one or more of the logical analysis processes, geometry analysis processes or simulation analysis processes discussed above are described in U.S. Pat. No. 6,230,299 to McSherry et al., issued May 8, 2001, U.S. Pat. No. 6,249,903 to McSherry et al., issued Jun. 19, 2001, U.S. Pat. No. 6,339,836 to Eisenhofer et al., issued Jan. 15, 2002, U.S. Pat. No. 6,397,372 to Bozkus et al., issued May 28, 2002, U.S. Pat. No. 6,415,421 to Anderson et al., issued Jul. 2, 2002, and U.S. Pat. No. 6,425,113 to Anderson et al., issued Jul. 23, 2002, each of which are incorporated entirely herein by reference.

Software Tools for Simulation, Verification or Modification of a Circuit Layout

To facilitate an understanding of various embodiments of the invention, one such software tool for automatic design automation, directed to the analysis and modification of a design for an integrated circuit, will now be generally described. As previously noted, the terms "design" and "design data" are used herein to encompass data describing an entire microdevice, such as an integrated circuit device or micro-electromechanical system (MEMS) device. These terms also are intended, however, to encompass a smaller set of data describing one or more components of an entire microdevice, such as a layer of an integrated circuit device, or even a portion of a layer of an integrated circuit device. Still further, the terms "design" and "design data" also are intended to encompass data describing more than one microdevice, such as data to be used to create a mask or reticle for simultaneously forming multiple microdevices on a single wafer. As also previously noted, unless otherwise specified, the term "design" as used herein is intended to encompass any type of design, including both physical layout designs and logical designs.

Figure 3:
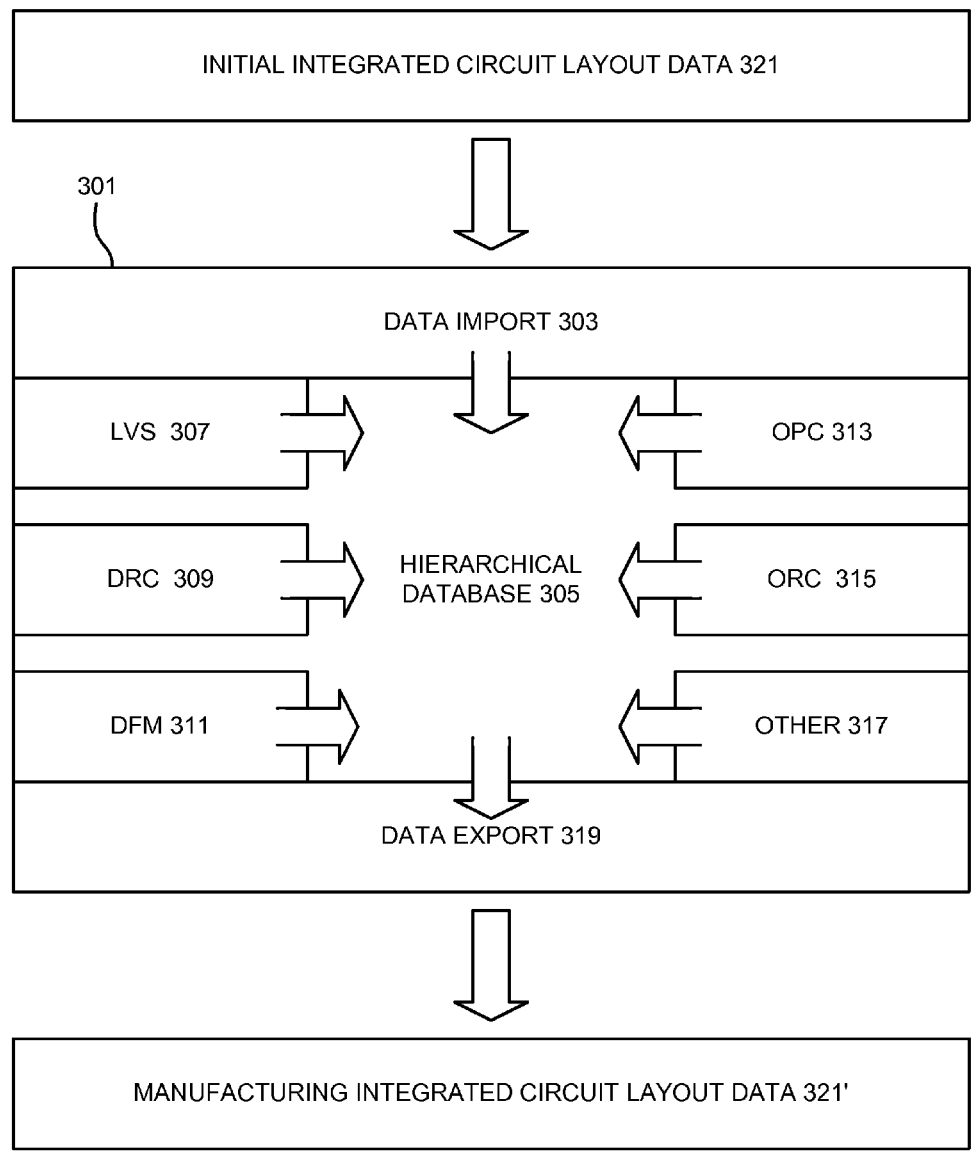
FIG. 3 schematically illustrates an example of a family of software tools for automatic design automation that may employ associative properties according to various embodiments of the invention.

As seen in FIG. 3, an analysis tool 301, which may be implemented by a variety of different software applications, includes a data import module 303 and a hierarchical database 305. The analysis tool 301 also includes a layout-versus-schematic (LVS) verification module 307, a design rule check (DRC) module 309, a design-for-manufacturing (DFM) module 311, an optical proximity correction (OPC) module 313, and an optical proximity rule check (ORC) module 315. The analysis tool 301 may further include other modules 317 for performing additional functions as desired, such as a phase shift mask (PSM) module (not shown), an etch simulation analysis module (not shown) and/or a planarization simulation analysis module (not shown). The tool 301 also has a data export module 319. One example of such an analysis tool is the Calibre family of software applications available from Mentor Graphics Corporation of Wilsonville, Oreg.

Initially, the tool 301 receives data 321 describing a physical layout design for an integrated circuit. The layout design data 321 may be in any desired format, such as, for example, the Graphic Data System II (GDSII) data format or the Open Artwork System Interchange Standard (OASIS) data format proposed by Semiconductor Equipment and Materials International (SEMI). Other formats for the data 321 may include an open source format named Open Access, Milkyway by Synopsys, Inc., and EDDM by Mentor Graphics, Inc. The layout data 321 includes geometric elements for manufacturing one or more portions of an integrated circuit device. For example, the initial integrated circuit layout data 321 may include a first set of polygons for creating a photolithographic mask that in turn will be used to form an isolation region of a transistor, a second set of polygons for creating a photolithographic mask that in turn will be used to form a contact electrode for the transistor, and a third set of polygons for creating a photolithographic mask that in turn will be used to form an interconnection line to the contact electrode. The initial integrated circuit layout data 321 may be converted by the data import module 303 into a format that can be more efficiently processed by the remaining components of the tool 301.

Once the data import module 303 has converted the original integrated circuit layout data 321 to the appropriate format, the layout data 321 is stored in the hierarchical database 305 for use by the various operations executed by the modules 305-317. Next, the layout-versus-schematic module 307 checks the layout design data 321 in a layout-versus-schematic process, to verify that it matches the original design specifications for the desired integrated circuit. If discrepancies between the layout design data 321 and the logical design for the integrated circuit are identified, then the layout design data 321 may be revised to address one or more of these discrepancies. Thus, the layout-versus-schematic process performed by the layout-versus-schematic module 307 may lead to a new version of the layout design data with revisions. According to various implementations of the invention tool 301, the layout data 321 may be manually revised by a user, automatically revised by the layout-versus-schematic module 307, or some combination thereof.

Next, the design rule check module 309 confirms that the verified layout data 321 complies with defined geometric design rules. If portions of the layout data 321 do not adhere to or otherwise violate the design rules, then the layout data 321 may be modified to ensure that one or more of these portions complies with the design rules. The design rule check process performed by the design rule check module 309 thus also may lead to a new version of the layout design data with various revisions. Again, with various implementations of the invention tool 301, the layout data 321 may be manually modified by a user, automatically modified by the design rule check module 309, or some combination thereof.

The modified layout data 321 is then processed by the design for manufacturing module 311. As previously noted, a "design-for-manufacture" processes attempts to identify elements in a design representing structures with a significant likelihood of being improperly formed during the manufacturing process. A "design-for-manufacture" process may additionally determine what impact the improper formation of the identified structures will have on the yield of devices manufactured from the circuit design, and/or modifications that will reduce the likelihood that the identified structures may be improperly formed during the manufacturing process. For example, a "design-for-manufacture" (DFM) software tool may identify wires that are connected by single vias, determine the yield impact based upon the probability that each individual single via will be improperly formed during the manufacturing process, and then identify areas where redundant visa can be formed to supplement the single vias.

The processed layout data 321 is then passed to the optical proximity correction module 313, which corrects the layout data 321 for manufacturing distortions that would otherwise occur during the lithographic patterning. For example, the optical proximity correction module 313 may correct for image distortions, optical proximity effects, photoresist kinetic effects, and etch loading distortions. The layout data 321 modified by the optical proximity correction module 313 then is provided to the optical process rule check module 315

The optical process rule check module 315 (more commonly called the optical rules check module or ORC module) ensures that the changes made by the optical proximity correction module 313 are actually manufacturable, a "downstream-looking" step for layout verification. This compliments the "upstream-looking" step of the LVS performed by the LVS module 307 and the self-consistency check of the DRC process performed by the DRC module 309, adding symmetry to the verification step. Thus, each of the processes performed by the design for manufacturing process 311, the optical proximity correction module 313, and the optical process rule check module 315 may lead to a new version of the layout design data with various revisions.

As previously noted, other modules 317 may be employed to perform alternate or additional manipulations of the layout data 321, as desired. For example, some implementations of the tool 301 may employ, for example, a phase shift mask module. As previously discussed, with a phase-shift mask (PSM) analysis (another approach to resolution enhancement technology (RET)), the geometric elements in a layout design are modified so that the pattern they create on the reticle will introduce contrast-enhancing interference fringes in the image. The tool 301 also may alternately or additionally employ, for example, an etch simulation analysis processes or a planarization simulation analysis processes. The process or processes performed by each of these additional modules 317 may also lead to the creation of a new version of the layout data 321 that includes revisions.

After all of the desired operations have been performed on the initial layout data 321, the data export module 319 converts the processed layout data 321 into manufacturing integrated circuit layout data 323 that can be used to form one or more masks or reticules to manufacture the integrated circuit (that is, the data export module 319 converts the processed layout data 321 into a format that can be used in a photolithographic manufacturing process). Masks and reticles typically are made using tools that expose a blank reticle or mask substrate to an electron or laser beam (or to an array of electron beams or laser beams), but most mask writing tools are able to only "write" certain kinds of polygons, however, such as right triangles, rectangles or other trapezoids. Moreover, the sizes of the polygons are limited physically by the maximum beam (or beam array) size available to the tool.

Accordingly, the data export module 319 may "fracture" larger geometric elements in the layout design, or geometric elements that are not right triangles, rectangles or trapezoids (which typically are a majority of the geometric elements in a layout design) into the smaller, more basic polygons that can be written by the mask or reticle writing tool. Of course, the data export module 319 may alternately or additionally convert the processed layout data 321 into any desired type of data, such as data for use in a synthesis process (e.g., for creating an entry for a circuit library), data for use in a place-and-route process, data for use in calculating parasitic effects, etc. Further, the tool 301 may store one or more versions of the layout 321 containing different modifications, so that a designer can undo undesirable modifications. For example, the hierarchical database 305 may store alternate versions of the layout data 321 created during any step of the process flow between the modules 307-317.

Data Organization

The design of a new integrated circuit may include the interconnection of millions of transistors, resistors, capacitors, or other electrical structures into logic circuits, memory circuits, programmable field arrays, and other circuit devices. In order to allow a computer to more easily create and analyze these large data structures (and to allow human users to better understand these data structures), they are often hierarchically organized into smaller data structures, typically referred to as "cells." Thus, for a microprocessor or flash memory design, all of the transistors making up a memory circuit for storing a single bit may be categorized into a single "bit memory" cell. Rather than having to enumerate each transistor individually, the group of transistors making up a single-bit memory circuit can thus collectively be referred to and manipulated as a single unit. Similarly, the design data describing a larger 16-bit memory register circuit can be categorized into a single cell. This higher level "register cell" might then include sixteen bit memory cells, together with the design data describing other miscellaneous circuitry, such as an input/output circuit for transferring data into and out of each of the bit memory cells. Similarly, the design data describing a 128 kB memory array can then be concisely described as a combination of only 64,000 register cells, together with the design data describing its own miscellaneous circuitry, such as an input/output circuit for transferring data into and out of each of the register cells.

By categorizing microcircuit design data into hierarchical cells, large data structures can be processed more quickly and efficiently. For example, a circuit designer typically will analyze a design to ensure that each circuit feature described in the design complies with specified design rules. With the above example, instead of having to analyze each feature in the entire 128 kB memory array, a design rule check process can analyze the features in a single bit cell. If the cells are identical, then the results of the check will then be applicable to all of the single bit cells. Once it has confirmed that one instance of the single bit cells complies with the design rules, the design rule check process then can complete the analysis of a register cell simply by analyzing the features of its additional miscellaneous circuitry (which may itself be made of up one or more hierarchical cells). The results of this check will then be applicable to all of the register cells. Once it has confirmed that one instance of the register cells complies with the design rules, the design rule check software application can complete the analysis of the entire 128 kB memory array simply by analyzing the features of the additional miscellaneous circuitry in the memory array. Thus, the analysis of a large data structure can be compressed into the analyses of a relatively small number of cells making up the data structure.

With various examples of the invention, layout design data may include two different types of data: "drawn layer" design data and "derived layer" design data. The drawn layer data describes geometric elements that will be used to form structures in layers of material to produce the integrated circuit. The drawn layer data will usually include polygons that will be used to form structures in metal layers, diffusion layers, and polysilicon layers. The derived layers will then include features made up of combinations of drawn layer data and other derived layer data. Thus, with a transistor gate, derived layer design data describing the gate may be derived from the intersection of a polygon in the polysilicon material layer and a polygon in the diffusion material layer.

For example, a design rule check process performed by the design rule check module 309 typically will perform two types of operations: "check" operations that confirm whether design data values comply with specified parameters, and "derivation" operations that create derived layer data. A transistor gate design data thus may be created by the following derivation operation:

gate=diff AND poly

The results of this operation will be a "layer" of data identifying all intersections of diffusion layer polygons with polysilicon layer polygons. Likewise, a p-type transistor gate, formed by doping the diffusion layer with n-type material, is identified by the following derivation operation:

pgate=nwell AND gate

The results of this operation then will be another "layer" of data identifying all transistor gates (i.e., intersections of diffusion layer polygons with polysilicon layer polygons) where the polygons in the diffusion layer have been doped with n-type material.

A check operation performed by the design rule check module 309 will then define a parameter or a parameter range for a data design value. For example, a user may want to ensure that no metal wiring line is within a micron of another wiring line. This type of analysis may be performed by the following check operation:

external metal<1

The results of this operation will identify each polygon in the metal layer design data that are closer than one micron to another polygon in the metal layer design data.

Also, while the above operation employs drawn layer data, check operations may be performed on derived layer data as well. For example, if a user wanted to confirm that no transistor gate is located within one micron of another gate, the design rule check process might include the following check operation:

external gate<1

The results of this operation will identify all gate design data representing gates that are positioned less than one micron from another gate. It should be appreciated, however, that this check operation cannot be performed until a derivation operation identifying the gates from the drawn layer design data has been performed.

Properties

Figure 4:
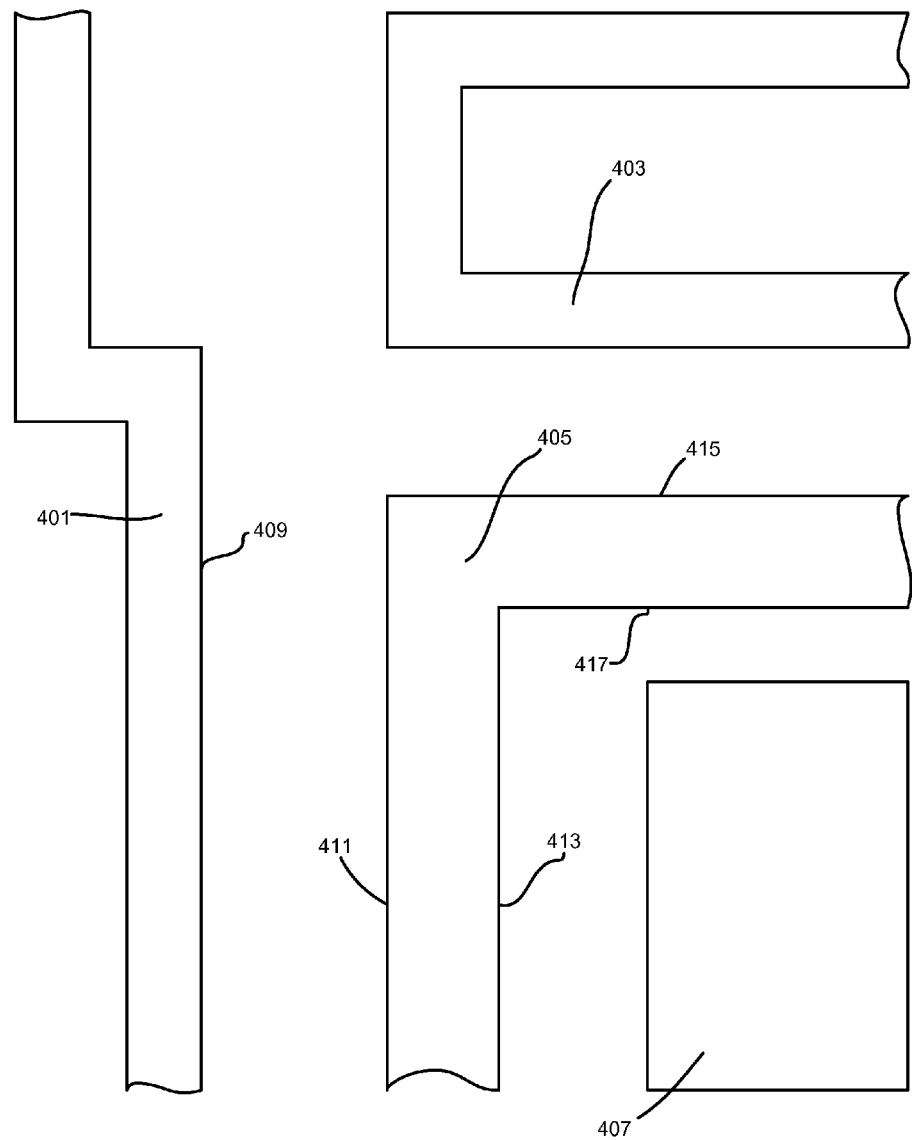
FIG. 4 illustrates geometric elements in a microcircuit layout design that may be associated with one or more properties according to various embodiments of the invention.

Various implementations of the invention relate to software tools for electronic design automation that create and/or employ associative properties. As will be discussed in more detail below, with some implementations of the invention, one or more properties can be generated and associated with any type of design object in a microdevice design. If the design is a physical layout for lithographically manufacturing an integrated circuit or other microdevice, for example, then one or more properties can be associated with any desired geometric element described in the design. Referring now to FIG. 4, this figure illustrates a portion of a layout design. The design includes a plurality of polygons 401-407 that will be used to form circuit structures in a layer of material, such as a layer of metal. Polygons 401-405, for example, may be used to form wiring lines for an integrated circuit. With various examples of the invention, one or more properties can be associated with a polygon, such as each of the polygons 401-407, or with a component of a polygon, such as the vertices of a polygon. Further, one or more properties can be associated with a polygon's edge, such as the edge 409 of the polygon 401. Still further, one or more properties can be associated with a pair of polygon edges, such as the edges 411 and 413 of the polygon 405. With various examples of the invention, each property may be represented as a new "layer" of data in the design.

When a property is associated with a design object in a layout design, its value may be derived from geometric data related to that design object. For example, if a property is associated with geometric element, such as a polygon, then it may have a value derived from the area of the polygon, the perimeter of the polygon, the number of vertices of the polygon, or the like. Similarly, if a property is associated with an edge, then the value of the property may be derived from the length or angle of the edge. Still further, if a property is associated with a pair of edges, then the value of the property may be derived from a separation distance between the edges, a total length of the edges, a difference in length between the edges, an area bounded by the edges, etc.

As will be apparent from the discussion below, however, it should be appreciated that a property value can be defined by any desired function. For example, a property may be defined as a constant value. The value of a property x thus may be defined by the function:

$$X=0.5$$

With this definition, the value of the property will always be 0.5.

A property's value also may be defined by a variable function. With a variable function, the value of a property may vary based upon, e.g., the specific data in the design. For example, a property X may be defined by the simple function:

$$X=\text{AREA}(\text{METAL1})*0.5+(\text{PERIMETER}(\text{METAL1}))^2$$

With this function, a property value is generated for every polygon in the design layer named "metal1." (That is, the input used to generate the property X is the data layer in the design name "metal1.") For each polygon in the design layer, the area of the polygon is calculated and multiplied by 0.5. In addition, the perimeter of the polygon is determined, and then squared. The multiplicand of the polygon's area with 0.5 is then added to the square of the polygon's perimeter to generate the value of the property X for associated with that polygon.

Thus, in FIG. 4, if the perimeter of the first polygon 401 is 68, and the area of the first polygon is 64, then the value of the property $X_1$ for the first polygon is $$X_1=(64*0.5)+(68)^2=4656$$

Similarly, if the perimeter of the second polygon 403 is 60 and the area of the second polygon is 66, then the value of the property $X_2$ of the second polygon is $$X_2=(60*0.5)+(66)^2=4386.$$

Still further, if the perimeter of the third polygon 405 is 60 and the area of the second polygon is 84, then the value of the property $X_3$ of the third polygon is $$X_1=(60*0.5)+(84)^2=7086,$$

and if the perimeter of the fourth polygon 407 is 34 and the area of the second polygon is 70, then the value of the property $X_4$ of the fourth polygon is $$X_4=(34*0.5)+(70)^2=4917$$

In addition to a "simple" function like that described above, a property also may be defined by a compound function that incorporates a previously-generated property value. For example, a first property x may be defined by the simple function described above:

$$X=\text{AREA}(\text{METAL1})*5+(\text{PERIMETER}(\text{METAL1}))^2$$

A second property, Y, can then be defined by a function that incorporates the value of the first property X, as follows:

$$Y=\text{PROP}(\text{METAL1},X)+1$$

Thus, the value of the property Y for a polygon is the value of the property x calculated for that polygon, plus one.

In addition to being defined by simple and compound functions, a property may be defined so that no property value is generated under some conditions. For example, a property associated with a polygon may be defined so that, if the area of the polygon is smaller than a threshold value, then no value is generated for the property. This feature may be useful where, for example, property values need only be generated for design objects having desired characteristics. If a design object does not have the required characteristics, then no property will be generated for the design object and it can be ignored in subsequent calculations using the generated property values.

More generally, a property's value may be defined by alternative functions, such as the functions below:

$$\text{IF AREA}(\text{METAL1})<0.5, \text{THEN } X=1$$

$$\text{IF AREA}(\text{METAL1})\geq 1, \text{THEN } X=\text{AREA}(\text{METAL1})*0.5+(\text{PERIMETER}(\text{METAL1}))^2$$

With these alternative functions, each polygon in the data layer "metal1" is analyzed. If the area of the polygon is below 0.5, then the value of the property X for the polygon is 1. Otherwise, the value of the property X for the polygon is the area of the polygon multiplied by 0.5, added to the square of the perimeter of the polygon.

A property may have multiple values. For example, a property may have an x-coordinate value, a y-coordinate value, and a z-coordinate value. Moreover, a property may have multiple, heterogeneous values. For example, a property may have a numerical value and a string value. Thus, a property associated with a cell can have a numerical value that may be, e.g., a device count of devices in the cell, while the string value may be, e.g., a model name identifying the library source for the cell. Of course, a property with multiple heterogeneous values can include any combination of value types, including any combination of the value types described above (e.g., one or more constant values, one or more vector values, one or more dynamic values, one or more alternate values, one or more simple values, one or more compound values, one or more alternate values, one or more string values, etc.).

Still further, the number of values of a property may change dynamically change. For example, a property K may have the values "a" and "b" (i.e., value of property K=a, b) before an electronic design automation process is executed. The electronic design automation process may then change the property to include a third value "c" (i.e., value of property K=a, b, c). Of course, the electronic design automation process also may alternately or additionally change the values of property K to one or more completely different values (e.g., value of property K=d, e, f). Moreover, with some implementations of the invention, the value of a property at one time may depend upon the value of the property at a previous time. For example, the value of a property Q at time $t_2$ may be derived from the value of the property Q at time $t_1$. Of course, in addition to constant values, and values generated based upon simple, compound, or alternative variable functions, a property's value can be specified according to any desired definition. For example, in addition to single or alternate mathematical functions, the value of a property may even be an array of constant values, variable functions, or some combination thereof. It should be appreciated, however, that, by using a scripting language as described above, property values can be dynamically generated during an electronic design automation process.

That is, by specifying property value definitions using a scripting language, the actual property values can be generated based upon the definitions when the design is analyzed during an electronic design automation process. If the data in the design is changed, then the property values will automatically be recalculated without requiring further input from the designer. Thus, employing a scripting language allows a designer or other user to develop properties and determine their values as needed. It also may provide the flexibility to allow third parties to develop new analysis techniques and methods, and then specify scripts that allow the user of an electronic design automation tool to use the scripts developed by a third party to generate property values for use with those new techniques and methods.

As previously noted, a property may be associated with any desired type of design object in a design. Thus, in addition to a single geometric element in a layout design, such as a polygon, edge, or edge pair, a property also can be associated with a group of one or more design objects in a layout design. For example, a property may be associated with a group of polygons or a hierarchical cell in a layout design (which themselves may be considered together as a single design object). A property also may be associated with an entire category of one or more design objects. For example, a property may be associated with every occurrence of a type of design object in a design layer, such as with every cell in a design, or every instance of a type of geometric element occurring in a design. A property also may be specifically associated with a particular placement of a cell in a design. In addition to design objects in a layout design, properties also may be associated with design objects in other types of designs, such as logical designs. A property thus may be associated with any desired object in a logical design, such as a net, a device, an instance of a connection pin, or even a placement of a cell in the design.

It also should be appreciated that, with various embodiments of the invention, a property associated with one design object also can be associated with another design object. Further, a property's value may be calculated using geometric or logical data for any desired design object, including design objects different from the design object with which the property is associated. With some implementations of the invention, a property's value may even be calculated using geometric or logical data for one or more design objects from multiple design data layers. For example, a designer may specify a design layer entitled "pair" that includes any specified edge pairs in a layout design, and another design layer entitled "edge" that includes specified edges in a layout design. A designer can then define a property z for each edge in the edge layer as:

$$Z=AREA(METAL1)/LENGTH(EDGE)+EW(PAIR)$$

where AREA is the area of one or more polygons related to the edge, LENGTH is the length of the edge, and EW is the width between the edges of an edge pair related to the edge. Thus, the value of the property z for an edge is dependent upon the area of some other polygon related to the edge.

With some implementations of the invention, various algorithms can be used to define which design objects, such as geometric elements, will be related to each other for use in a property definition. For example, the definition for property z above may employ a relationship algorithm that includes a polygon in the property value determination if the polygon touches the edge associated with the property, and includes an edge pair in the property value determination if one edge is the edge associated with the property and the second edge is connected to the first edge through a polygon (i.e., both edges are part of the same polygon, as opposed to being separated by an empty space).

Of course, any desired algorithms can be used to determine which design objects will be related to each other for determining the value of a property. Other possible relationship algorithms for physical layout designs, for example, may relate all geometric elements that overlap, all geometric elements that intersect, all geometric elements that touch or otherwise contact each other, or all geometric elements that are within a defined proximity of another geometric element. With still other relationship algorithms, if one geometric element touches multiple geometric elements, the algorithms can decide to treat the touching geometric elements as errors, or to relate all touched shapes. Still other relationship algorithms can employ clipping, where, e.g., if a first geometric element intersects a second geometric element, only the part of the second geometric element inside the first geometric element is employed when determining a property value, etc.

Similarly, a variety of relationship algorithms can be used to relate design objects in a logical design to each other for use in a property definition. For example, a property definition may relate all design objects that belong to the same logical device, all design objects that share a common net, or all design objects that share a reference identifier with, e.g., the design object with which the property is associated. Of course, still other relationship criteria can be employed to relate design objects in designs to each other for use in a property definition.

Further, by defining a second property value so that it incorporates a first property value, a property value associated with any design object or group of design objects can be associated with any other design object or group of design objects. For example, a property for a first polygon may be the area of that polygon. A property for a second polygon touching or contacting that first polygon can then be defined as the area of the first polygon. In this manner, a property value associated with the first polygon can be associated with the second polygon. Thus, a property associated with a geometric element also can be associated with a cell incorporating that geometric element. Similarly, a property associated with a geometric element can be associated with an adjacent geometric element. Still further, a property of a geometric element can be associated with the entire data layer in a design.

With various implementations of the invention, the value of a property associated with a design object property value is separate from a description of the design object with which the property is associated. That is, with various implementations of the invention the value of a property is not simply a characteristic of the design object with which the property is associated, but instead may be considered a distinct design object itself. According to some implementations of the invention, for example, the property values for various design objects may be stored in an array. FIG. 5 illustrates one example of a type of array that may be employed by various implementations of the invention. As seen in this figure, the array 501 includes a column listing identifiers 503. It also includes a column with property values 505 for a property G, a column with property values 505 for a property H, and a column with property values 505 for a property I.

Each identifier 503 identifies an occurrence of a design object associated with each of the properties G, H, and I. With the illustrated example, the design object may be, e.g., a type of cell in a hierarchical physical layout design. The definition for the property G then may be the coordinate value for the placement of the cell, while the definition of the property H may be both the library from which the cell was obtained and the count of the cell in the design. The definition of the property I then may be the percentage at which the structure described in the cell will be improperly formed during a manufacturing process. From the array 501, it can thus be determined that, e.g., the cell "design object 8" is located at the x, y coordinate values 40, 8 in the design, was originally obtained from library 8, and is the ninth occurrence of that cell in the design. Also, the value of property I for this cell indicates that it has a 0.000009% failure rate when manufactured.

While a table-type array is illustrated in FIG. 5 for each of understanding, it should be appreciated that, as used herein, the term "array" is intended to encompass any type of data structure that behaves like a logical array. Thus, various implementations of the invention may alternately or additionally employ, for example, such structures as a Calibre number table (used with the Calibre family of software tools available from Mentor Graphics Corporation of Wilsonville, Oreg.) or a Standard Template Library (STL) deque. It also should be appreciated that, while FIG. 5 illustrates a single set of property values for each design object, various implementations of the invention may allow multiple identifies to be associated with a single set of property values. This arrangement may be beneficial, e.g., for reducing memory usage where one or more design objects will have the same value for an associated property. Also, it should be noted that various implementations of the invention may update a property value by overwriting or otherwise replacing the previous property value in memory with the updated property value, to conserve memory usage.

Voltage-Related Analysis

Figure 6:
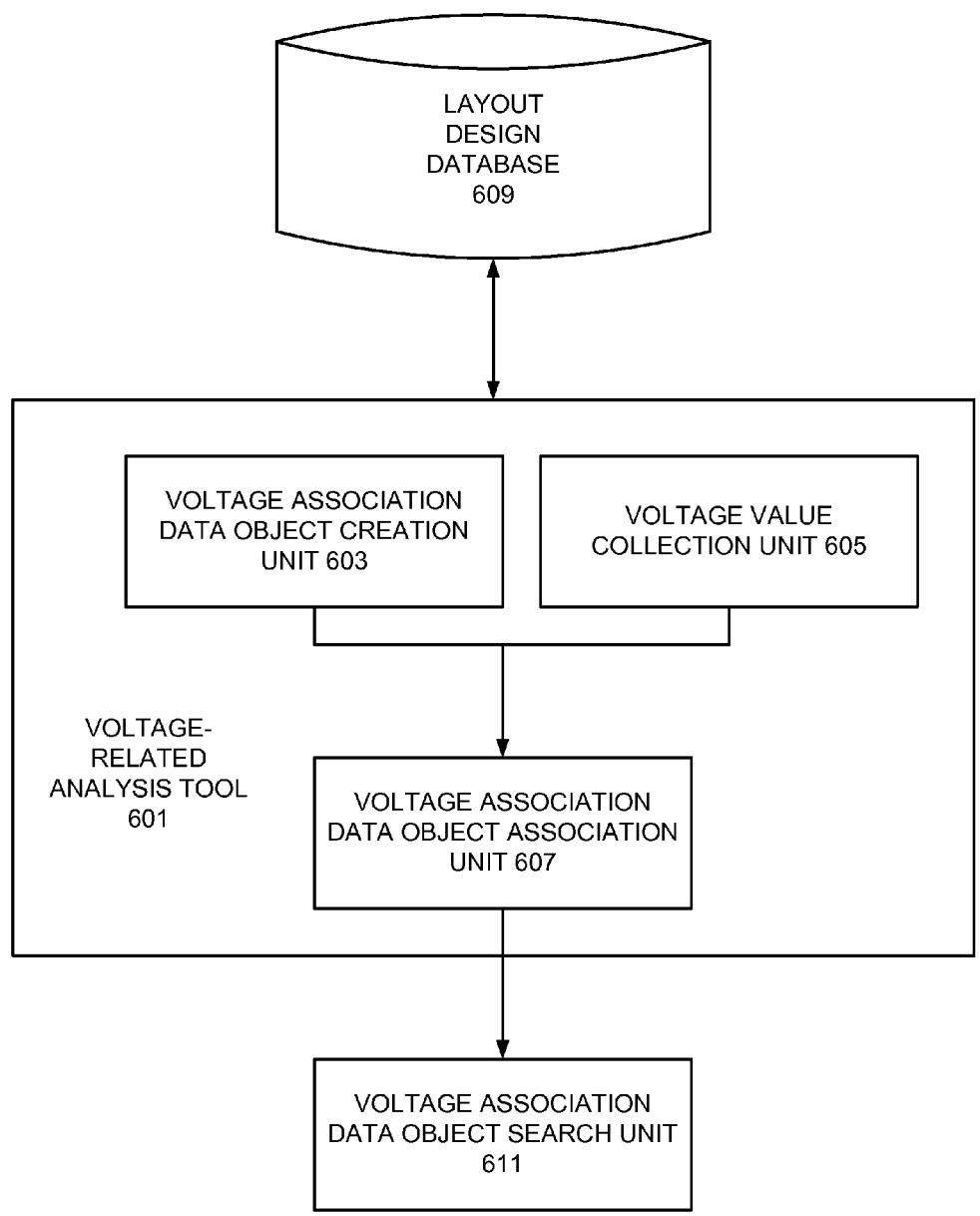
FIG. 6 illustrates a voltage-related analysis tool that may be implemented according to various implementations of the invention.

FIG. 6 illustrates a voltage-related analysis tool 601 that may be implemented according to various implementations of the invention. As seen in this figure, the tool 601 includes a voltage association data object creation unit 603, a voltage value collection unit 605, and a voltage association data object association unit 607. The tool 601 may work in cooperation with a layout design database 609, which can be used to store layout design data including drawn and derived layer data, and a voltage association data object search unit 611.

As will be discussed in more detail below, the voltage association data object creation unit 603 is configured to create data objects for layers in layout design data. With various implementations of the invention, the voltage association data object creation unit 603 will create a single voltage association data object for each specified layer in each specified net of the layout design data. For each voltage association data object, the voltage value collection unit 605 then collects voltage values or range of voltage values associated with the net. The voltage association data object association unit 607 then associates voltage values or range of voltage values with the voltage association data objects for the net. The voltage association data object search unit 611 can search the voltage association data objects according to a predetermined criterion. The predetermined criterion may be, for example, geometric elements in a particular layer associated with a specified voltage value or range of voltage values.

As previously noted, various examples of the invention may be implemented by a multiprocessor computing system, such as the multiprocessor computing system 101 illustrated in FIG. 1. Accordingly, one or more components of each of the voltage association data object creation unit 603, voltage value collection unit 605, the voltage association data object association unit 607, and the voltage association data object search unit 611 may be implemented using one or more processors in a multiprocessor computing system's master computer, such as the master computer 103, one or more servant computers in a multiprocessor computing system, such as the servant computers 117, or some combination of both. It also should be appreciated that, while the voltage association data object creation unit 603, voltage value collection unit 605, the voltage association data object association unit 607, and the voltage association data object search unit 611 are shown as separate units in FIG. 6, a single servant computer (or a single processor within a master computer) may be used to implement two or more of these modules at different times, or components of two or more of these modules at different times. As should also be appreciated by those of ordinary skill in the art, the layout design database 609 may be implemented using any conventional memory storage device, such as a magnetic disk drive, and optical disk drive, a solid state memory, or any combination thereof.

Also, while the voltage association data object creation unit 603, the voltage value collection unit 605, and the voltage association data object search unit 607 are all illustrated in FIG. 6 as being components of the voltage-related analysis tool 601, it should be appreciated that, with various implementations of the invention, the voltage association data object search unit 607 may be implemented as a separate tool from the voltage association data object creation unit 603 and the voltage value collection unit 605.

Figure 7:
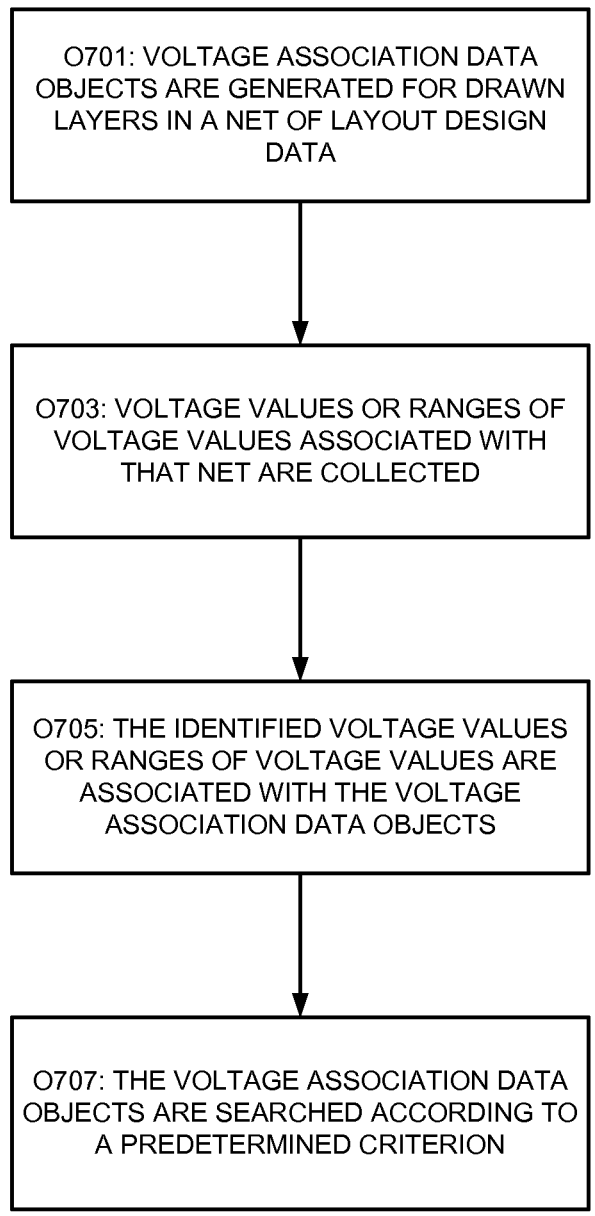
FIG. 7 illustrates a flowchart showing a method for performing voltage-related analyses that may be implemented according to various implementations of the invention.

FIG. 7 illustrates a flowchart showing a method for performing voltage-related analyses that may be implemented according to various implementations of the invention. For convenience of understanding, the method will be described with reference to the voltage-related analysis tool 601 illustrated in FIG. 6. It should be appreciated, however, that various embodiments of the invention may implement the method illustrated in FIG. 6 using electronic automation design tools other than the voltage-related analysis tool 601. Similarly, according to various embodiments of the invention, the voltage-related analysis tool 601 may be used to employ voltage-related analysis methods other than the method shown in FIG. 7.

Initially, in operation 701, the voltage association data object creation unit 603 generates voltage association data objects for drawn layers in a net of layout design data. Typically, one voltage association data object is generated for a physical drawn layer, which represents a physical layer of material in an integrated circuit to be made using the layout design data. For example, one voltage association data object may be attached to a first drawn layer (metal 1) representing a first layer of metal in the integrated circuit, another one to a second drawn layer (poly 1) representing a first layer of poly material in the integrated circuit, and still another one to a third metal layer (metal 2) representing a second layer of metal in the integrated circuit. Of course, with various implementations of the invention, a voltage association data object may be attached to an abstract drawn layer (i.e., a drawn layer that does not directly correspond to a physical layer in an integrated circuit) in a net, or to a derived layer in a net.

With various implementations of the invention, a voltage association data object may itself be an object in a drawn layer, such as a trapezoid. This arrangement allows the voltage association data object to be attached to a drawn layer in a net by placing the object (e.g., the trapezoid) in the layout design data so that it overlays a geometric element in the desired drawn layer.

Next, in operation 703, the voltage value collection unit 605 collects voltage values or ranges of voltage values associated with that net. This information may be obtained by examining all of the geometric elements in the net, and recording the voltage information from those geometric elements associated with voltage markers. Alternately, various implementations of the invention may create the voltage association data object before any voltage markers are created and added to the layout design data.

In operation 705, the voltage association data object association unit 607 then associates the collected voltage values or ranges of voltage values for the net to the voltage association data objects. Each of the voltage association data objects will be associated with voltage values for a particular layer of the net. With various implementations of the invention, the voltage values or ranges of voltage values may be attached to the voltage association data object as properties. Of course, still other implementations of the invention may employ any desired technique to associate the obtained voltage values or ranges of voltage values for the net to the voltage association data objects.

With various implementations of the invention, operations 701-705 are repeated for each specified net (e.g., all nets) in the layout design data. Thus, according to various implementations of the invention, a voltage association data object will be attached to each layer in each net of the layout design data.

In operation 707, the voltage association data object search unit 611 searches the voltage association data objects according to a predetermined criterion. The predetermined criterion may be, for example, geometric elements in a particular layer associated with a specified voltage value or range of voltage values. Under this arrangement, an electronic design verification tool need only review the voltage association data objects for a particular layer to determine if any nets in the design data include geometric elements in that layer associated with a voltage value or range of voltage values. For example, an electronic design verification tool may need to perform a particular design rule check on all geometric elements in a metal 1 layer associated with a specified range of voltages. Rather than examining all geometric elements in all layers of all nets, various implementations of the invention allow the electronic design verification tool to perform a significantly faster search. In particular, the voltage association data object search unit 611 can be used to identify only the voltage association data objects attached to the metal 1 layer in each net. The voltage association data object search unit 611 will then examine the ranges of voltage values associated with those voltage association data objects, to determine which nets have geometric elements in the metal 1 layer associated with the specified range of voltages. This information can then be provided to the electronic design verification tool to perform the desired voltage-related analysis.

CONCLUSION

While the invention has been described with respect to specific examples including presently preferred modes of carrying out the invention, those skilled in the art will appreciate that there are numerous variations and permutations of the above described systems and techniques that fall within the spirit and scope of the invention as set forth above. For example, while specific terminology has been employed above to refer to electronic design automation processes, it should be appreciated that various examples of the invention may be implemented using any desired combination of electronic design automation processes.

Thus, in addition to use with "design-for-manufacture" processes, various examples of the invention can be employed with "design-for-yield" (DFY) electronic design automation processes, "yield assistance" electronic design automation processes, "lithographic-friendly-design" (LFD) electronic design automation processes, including "chip cleaning" and "design cleaning" electronic design automation processes, etc. Likewise, in addition to use with "design-rule-check" electronic design automation processes, various implementations of the invention may be employed with "physical verification" electronic design automation processes. Also, in addition to being used with OPC and ORC electronic design automation processes, various implementations of the invention may be used with any type of resolution enhancement electronic design automation processes.

What is claimed is:

1. One or more processor-readable storage device storing computer-executable instructions for causing one or more processors to perform a method, the method comprising:
    generating, using the one or more processors, voltage association data objects for drawn layers in a net of a layout design, each of the voltage association data objects being generated for one of the drawn layers;
    collecting, using the one or more processors, a voltage value or range of voltage values for each geometric element of the net, wherein the net comprises two or more geometric elements;
    associating, using the one or more processors, the voltage values or ranges of voltage values collected for each of the geometric elements of the net with the voltage association data objects; and
    searching, using the one or more processors, the voltage association data objects according to a predetermined criterion to determine whether at least one of the geometric elements of the net matches the predetermined criterion without searching voltage values of the geometric elements of the net themselves.

2. The one or more processor-readable storage device recited in claim 1, wherein the method further comprises:
    repeating the generating, the collecting, and the associating, and the searching for other nets of the layout design.

3. The one or more processor-readable storage device recited in claim 1, wherein the predetermined criterion includes a specific voltage value or a range of voltage values.

4. The one or more processor-readable storage device recited in claim 3, wherein the searching the voltage association data objects comprises:
    comparing the specific voltage value or range of voltage values of the predetermined criterion with one or more of the voltage values or ranges of voltage values associated with the voltage association data objects;
    determining that one or more of the voltage association data objects matches the predetermined criterion based on the comparing; and
    identifying the net as a search result based on the one or more matched voltage association data objects.

5. The one or more processor-readable storage device recited in claim 1, wherein the voltage association data objects are trapezoids.

6. The one or more processor-readable storage device recited in claim 1, wherein the method further comprises:
    attaching each of the voltage value association data objects to the drawn layer for which the voltage value association data object was generated.

7. The one or more processor-readable storage device recited in claim 1, wherein the associating the voltage values or ranges of voltage values with the voltage association data objects comprises:
attaching the voltage values or ranges of voltage values to the voltage association data objects as properties.

8. The one or more processor-readable storage device recited in claim 1, wherein each of the drawn layers represents a physical layer of material in an integrated circuit to be made using the layout design.

9. The one or more processor-readable storage device recited in claim 1, wherein the collecting comprises:
examining multiple geometric elements of the net; and
recording a voltage value or range of voltage values from voltage markers associated with two or more geometric elements of the multiple geometric elements.

10. The one or more processor-readable storage device recited in claim 1, wherein the method further comprises:
performing a design rule check on the net using an electronic design verification tool if the net matched the predetermined criterion.

11. A method, executed by at least one processor of a computer, comprising:
generating, using the at least one processor, voltage association data objects for drawn layers in a net of a layout design, each of the voltage association data objects being generated for one of the drawn layers;
collecting, using the at least one processor, voltage values or ranges of voltage values for each geometric element of the net, wherein the net comprises more than one geometric element;
associating, using the at least one processor, the voltage values or ranges of voltage values collected for each of the geometric elements of the net with the voltage association data objects; and
identifying, using the at least one processor, the net as a candidate for electronic design verification by searching the voltage association data objects according to a predetermined criterion and determining that at least one of the more than one geometric elements of the net matches the predetermined criterion without searching voltage values of the geometric elements of the net themselves.

12. The method recited in claim 11, further comprising:
repeating the generating, the collecting, the associating, and the identifying for other nets of the layout design.

13. The method recited in claim 12, further comprising:
performing a design rule check on the identified nets of the layout design using an electronic design verification tool.

14. The method recited in claim 11, wherein the predetermined criterion includes a specific voltage value or a range of voltage values within a specific drawn layer.

15. The method recited in claim 11, wherein the voltage association data objects are trapezoids.

16. A system comprising:
one or more processors, the one or more processors programmed to perform a method, the method comprising:
generating voltage association data objects for drawn layers in a net of a layout design, each of the voltage association data objects being generated for one of the drawn layers;
collecting a voltage value or range of voltage values for each of multiple geometric elements of the net, wherein the net comprises more than one geometric element;
associating the voltage values or ranges of voltage values collected for the multiple geometric elements of the net with the voltage association data objects; and
searching the voltage association data objects according to a predetermined criterion to determine whether at least one of the multiple geometric elements of the net matches the predetermined criterion without searching voltage values of the multiple geometric elements of the net themselves.

17. The system recited in claim 16, wherein the method further comprises:
repeating the generating, the collecting, the associating, and the searching for other nets of the layout design.

18. The system recited in claim 16, wherein the predetermined criterion includes a specific voltage value or a range of voltage values within a specific drawn layer.

19. The system recited in claim 16, wherein the voltage association data objects are trapezoids.

20. The system recited in claim 16, wherein the method further comprises:
performing a design rule check on the net using an electronic design verification tool if at least one of the two or more geometric elements of the net matched the predetermined criterion.

* * * * *